(12) United States Patent
Ikuta

(10) Patent No.: US 9,360,719 B2
(45) Date of Patent: Jun. 7, 2016

(54) DISPLAY DEVICE

(71) Applicant: Sharp Kabushiki Kaisha, Osaka-shi, Osaka (JP)

(72) Inventor: Kei Ikuta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 43 days.

(21) Appl. No.: 14/411,549

(22) PCT Filed: Aug. 1, 2013

(86) PCT No.: PCT/JP2013/004672
§ 371 (c)(1),
(2) Date: Dec. 29, 2014

(87) PCT Pub. No.: WO2014/024440
PCT Pub. Date: Feb. 13, 2014

(65) Prior Publication Data
US 2015/0160500 A1    Jun. 11, 2015

(30) Foreign Application Priority Data

Aug. 8, 2012  (JP) ................................ 2012-176394

(51) Int. Cl.
*G02F 1/1345*     (2006.01)

(52) U.S. Cl.
CPC ........ *G02F 1/13452* (2013.01); *G02F 1/13454* (2013.01); *G02F 2001/13456* (2013.01)

(58) Field of Classification Search
CPC .................. G02F 1/13452; G02F 2001/13456; G02F 1/13454
See application file for complete search history.

(56) References Cited

U.S. PATENT DOCUMENTS

2009/0153790 A1\* 6/2009 Tashiro ............... G02F 1/13452
349/149

FOREIGN PATENT DOCUMENTS

JP     2009-180904 A    8/2009

\* cited by examiner

*Primary Examiner* — Richard Kim
*Assistant Examiner* — Kendrick Hsu
(74) *Attorney, Agent, or Firm* — Keating & Bennett, LLP

(57) ABSTRACT

A tip edge (31) of an FPC (30E) bonded at a most outward position in an arrangement direction (30D) of a plurality of FPCs (30) has an edge (32) inclined relative to an edge (3*e*) of a terminal region (3T) to face a center of a display panel (X). An IC chip (20E) facing the tip edge (31) of the FPC (30E) bonded at the most outward position is arranged parallel to the inclined edge (32) of the FPC (30E).

6 Claims, 9 Drawing Sheets

DISPLAY DEVICE

TECHNICAL FIELD

The present invention relates to display devices having a so-called chip on glass (COG) packaging structure in which electronic circuit chips and at least one flexible printed circuit board (FPC) are directly connected to a surface of a substrate included in a display panel, in particular, a technique for improving connection reliability of the FPCs to the display panel having a narrow picture-frame structure.

BACKGROUND ART

A liquid crystal display device having a COG packaging structure is configured such that integrated circuit (IC) chips serving as drivers are directly mounted to a terminal region provided in the periphery of a liquid crystal display panel, and FPCs for supplying signals to the chips are bonded to the terminal region. Each FPC has a tip portion bonded to the terminal region, and each IC chip is disposed to face a tip edge, which is located on the side to be bonded to the terminal region, of the corresponding one of the FPCs. In general, the tip edge of the FPC, as well as the IC chip facing the FPC, is disposed parallel to an edge of the terminal region (an outer edge of the liquid crystal display panel).

A liquid crystal display device of recent years which has an increased definition and the COG packaging structure includes a plurality of IC chips arranged in the terminal region as the number of interconnects in the liquid crystal display panel increases.

For example, Patent Document 1 describes, as an example liquid crystal display device having the COG packaging structure, a configuration in which rectangular driver IC chips for driving a display panel are mounted to a terminal region to be oblique to a predetermined axis. PATENT DOCUMENT 1 describes that such a configuration provides a compact liquid crystal display device in which malfunctions in the driver IC chips are reduced while a liquid crystal display panel can be deformed even in the case where the driver IC chips are arranged along a line in a direction vertical to the predetermined axis.

CITATION LIST

Patent Document

PATENT DOCUMENT 1: Japanese Unexamined Patent Publication No. 2009-180904

SUMMARY OF THE INVENTION

Technical Problem

In the above-described liquid crystal display device having the COG packaging structure, it is important not only the IC chips but also the FPCs are reliably connected to the terminal region so that the liquid crystal display panel normally performs display operation.

However, the width of a terminal region of a liquid crystal display device of recent years is also reduced due to frame narrowing in which the width of a non-display region, a so-called picture-frame region of the liquid crystal display panel is reduced, so that the adhesion area of the FPC to the terminal region is necessarily reduced. This may possibly reduce the adhesiveness of the FPCs to the terminal region. Here, in a fabrication process of a liquid crystal display device, for example, in accommodating the liquid crystal display panel together with a backlight unit in a housing, the FPCs are twisted by a warp and are thus deformed, so that external force may be applied to adhesion sections of the FPCs in a delamination direction. In particular, side end portions of the FPCs which are located on both outer positions in the arrangement direction of the IC chips are susceptible to the external force. Thus, the FPCs are more likely delaminated from the terminal region with the side end portions as starting points of the delamination.

In view of the foregoing, it is an object of the present invention to provide a display device having a COG packaging structure, in which the connection reliability of the FPC to the display panel is enhanced without increasing the terminal region.

Solution to the Problem

To achieve the object, in the invention, a tip edge, which is located on the side to be bonded to a terminal region, of the FPC has a suitable shape, and the IC chips facing the tip edge are suitably arranged.

Specifically, the present invention is directed to a display device having the COG packaging structure with the following features.

That is, a first aspect of the invention is a display device including: a display panel having a display region and a terminal region; a plurality of flexible printed circuit boards arranged along a periphery of the terminal region and having tip portions bonded to the terminal region; and a plurality of electronic circuit chips each arranged on the terminal region to face a tip edge of a corresponding one of the bonded flexible printed circuit boards, wherein the tip edges of the flexible printed circuit boards bonded at most outward positions in an arrangement direction of the flexible printed circuit boards have edges inclined relative to an edge of the terminal region to face a center of the display panel, and the electronic circuit chips facing the tip edges of the flexible printed circuit boards bonded at the most outward positions are arranged parallel to the inclined edges of the flexible printed circuit boards.

Note that "outward positions . . . in the arrangement direction of the FPCs" here means portions located outwardly in the arrangement (alignment) direction of the FPCs.

In the first aspect of the invention, the tip edges of the FPCs bonded at the most outward positions of the terminal region in the arrangement direction of the FPCs have edges inclined relative to an edge of the terminal region to face a center of the display panel. The distance from the edge of the terminal region to the inclined edge of the FPC gradually increases from an inside toward the outside of the terminal region in the arrangement direction of the FPCs. That is, an adhesion length of the FPC increases in accordance with the distance from the edge of the terminal region to the inclined edge of the FPC as the distance to the outside of the terminal region decreases in the arrangement direction of the FPCs. Thus, a side end portion (hereinafter also referred to as an outer end portion) of the FPC bonded at the most outward position has increased adhesiveness to the terminal region, wherein the outer end portion is located on an outer position of the terminal region in the arrangement direction of the FPCs and is particularly susceptible to external force. Therefore, it is possible to prevent delamination of the FPC from the terminal region, and it is possible to enhance the connection reliability of the FPC to the display panel.

The electronic circuit chip facing the tip edge of the FPC bonded at the most outward position is arranged along the inclined edge of the FPC. Therefore, it is not necessary to increase the terminal region to increase the adhesion length of the FPC due to the inclination of the tip edge as described above. If the electronic circuit chip is arranged parallel to the edge of the terminal region as in a conventional configuration, the electronic circuit chip facing the tip edge of the FPC bonded at the most outward position has to be arranged at a position spaced away from the edge of the terminal region by an increased part of the adhesion length of the FPC due to the inclined edge so that the electronic circuit chip and the FPC do not overlap each other. Therefore, the terminal region is inevitably increased. In contrast, in the first aspect of the invention, the electronic circuit chip is inclined parallel to the inclined edge of the FPC. Therefore, it is possible to avoid overlapping of the electronic circuit chip and the FPC without increasing the terminal region.

Therefore, according to the first aspect of the invention, in the display device having the COG packaging structure, the connection reliability of the FPC to the display panel can be enhanced without increasing the terminal region.

A second aspect of the invention is the display device of the first aspect of the invention, wherein each of the tip edges of the flexible printed circuit boards bonded at the most outward positions has a parallel edge which is continuous with the inclined edge and is parallel to the edge of the terminal region, and the parallel edge is located outwardly from the inclined edge in the arrangement direction of the flexible printed circuit boards.

If the tip edge of the FPC bonded at the most outward positions has the inclined edge, and a tip end portion of the inclined edge of the FPC, that is, a tip of the outer end portion has a corner having an acute angle, stress caused by application of external force to the FPC is concentrated on the corner. Therefore, the FPC may be delaminated from the terminal region.

In contrast, in the second aspect of the invention, the tip edge of the FPC bonded at the most outward position has the edge parallel to the edge of the terminal region and located outwardly from the inclined edge in the arrangement direction of FPCs. Therefore, the stress caused by application of external force to the FPC is distributed at the part of the FPC forming the parallel edge. Thus, the delamination of the FPC bonded at the most outward position from the terminal region can be more satisfactorily prevented.

A third aspect of the invention is the display device of the first or second aspect of the invention, wherein an angle θ formed between the inclined edge and the edge of the terminal region is determined to satisfy an inequality $0°<\theta<45°$.

If the angle θ formed between the inclined edge of the FPC and the edge of the terminal region is greater than or equal to 45°, the electronic circuit chip arranged parallel to the inclined edge of the FPC is also inclined at the same angle as the inclined edge of the FPC. Thus, some of the lead interconnects routed from the display region to positions corresponding to the electronic circuit chip in the terminal region have to be formed at a relatively small angle to the IC chip. Therefore, if a predetermined distance at which no leak is caused between the adjacent lead interconnects is ensured in consideration of positional variation of the adjacent lead interconnects, the terminal region may be increased compared to the case where each electronic circuit chip is arranged parallel to and is not inclined relative to the edge of the terminal region. Thus, frame narrowing may be inhibited.

In contrast, in third aspect of the present invention, the angle θ formed between the inclined edge of the FPC and the edge of the terminal region is greater than 0° and less than 45°. Therefore, the tilt angle of the electronic circuit chip arranged parallel to the inclined edge of the FPC is also greater than 0° and less than 45° in accordance with the inclined edge of the FPC, so that the lead interconnects routed to positions corresponding to the electronic circuit chip can be formed at a relatively large angle to the electronic circuit chip. With this configuration, it is possible to ensure a predetermined distance between the adjacent ones of the lead interconnects without increasing the terminal region. Thus, frame narrowing can be satisfactorily achieved while the connection reliability of the FPC to the liquid crystal display panel is enhanced.

A fourth aspect of the invention is a display device including: a display panel having a display region and a terminal region; a flexible printed circuit board having a tip portion bonded to the terminal region; and a plurality of electronic circuit chips arranged in the terminal region to face a tip edge of the bonded flexible printed circuit board, wherein the tip edge of the flexible printed circuit board has edges inclined relative to an edge of the terminal region to face a center of the display panel, the inclined edges are located at both end portion of the tip edge of the flexible printed circuit board, and the electronic circuit chips arranged at positions facing the inclined edges are inclined parallel to the inclined edges.

In the fourth aspect of the invention, both ends of the tip edge of the FPC have edges inclined relative to an edge of the terminal region to face a center of the display panel. The distance from the edge of the terminal region to the inclined edge of the FPC gradually increases from an inside toward the outside of the terminal region in the arrangement direction of the FPCs. That is, an adhesion length of the FPC increases in accordance with the distance from the edge of the terminal region to the inclined edge of the FPC as the distance to the outside of the terminal region decreases in the arrangement direction of the FPCs. Thus, a side end portion (an outer end portion) of the FPC has increased adhesiveness to the terminal region, wherein the outer end portion is located on an outer position of the terminal region in a direction along the edge of the terminal region and is most susceptible to external force. This can prevent delamination of the FPC from the terminal region and enhance the connection reliability of the FPC to the display panel.

The electronic circuit chip at a position facing the inclined edge of the FPC is arranged parallel to the inclined edge of the FPC. Therefore, it is not necessary to increase the terminal region to increase the adhesion length of the FPC due to the inclination of the tip edge as described above. If the electronic circuit chip is arranged parallel to the edge of the terminal region as in a conventional configuration, the electronic circuit chip facing the inclined edge of the FPC has to be arranged at a position spaced away from the edge of the terminal region by an increased part of the adhesion length of the FPC due to the inclined edge so that the electronic circuit chip and the FPC do not overlap each other. Therefore, the terminal region is inevitably increased. In contrast, in the fourth aspect of the invention, the electronic circuit chip is inclined parallel to the inclined edge of the FPC. Therefore, it is possible to avoid overlapping of the electronic circuit chip and the FPC without increasing the terminal region.

Therefore, according to the fourth aspect of the invention, in the display device having the COG packaging structure, the connection reliability of the FPC to the display panel can be enhanced without increasing the terminal region.

A fifth aspect of the invention is the display device of the fourth aspect of the invention, wherein an angle θ formed between the inclined edge and the edge of the terminal region is determined to satisfy an inequality $0°<\theta<45°$.

In fifth aspect of the present invention, the angle θ formed between the inclined edge of the FPC and the edge of the terminal region is greater than 0° and less than 45°. Therefore, the tilt angle of the electronic circuit chip arranged parallel to the inclined edge of the FPC is also greater than 0° and less than 45° in accordance with the inclined edge of the FPC, so that the lead interconnects routed to positions corresponding to the electronic circuit chip can be formed at a relatively large angle to the electronic circuit chip. With this configuration, it is possible to ensure a predetermined distance between the adjacent ones of the lead interconnects without increasing the terminal region. Thus, frame narrowing can be satisfactorily achieved while the connection reliability of the FPC to the liquid crystal display panel is enhanced.

A sixth aspect of the invention is the display device of any one of first to fifth aspects of the invention, wherein the display panel is a liquid crystal display panel.

According to the sixth aspect of the invention, a liquid crystal display device having a COG packaging structure and having high connection reliability of an FPC to a liquid crystal display panel is obtained at the same time of frame narrowing.

Advantages of the Invention

According to the present invention, in a configuration in which a plurality of FPCs are arranged along an edge of a terminal region and tip portions of the FPCs are bonded to the terminal region, a tip edge of an FPC bonded at an most outward position, as well as an electronic circuit chip facing the tip edge, has an inclined edge facing the center of a display panel, whereas in a configuration in which a tip portion of a FPC is bonded to a terminal region, both ends of an tip edge of the FPC, as well as electronic circuit chips facing the tip edge, have inclined edges facing the center of a display panel. Therefore, the connection reliability of the FPC to the display panel can be increased in a display device having a COG packaging structure without increasing the terminal region.

DESCRIPTION OF EMBODIMENTS

Embodiments of the present disclosure will be described in detail below based on the drawings. The present invention is not limited to the following embodiments.

First Embodiment of Invention

Figure 1:
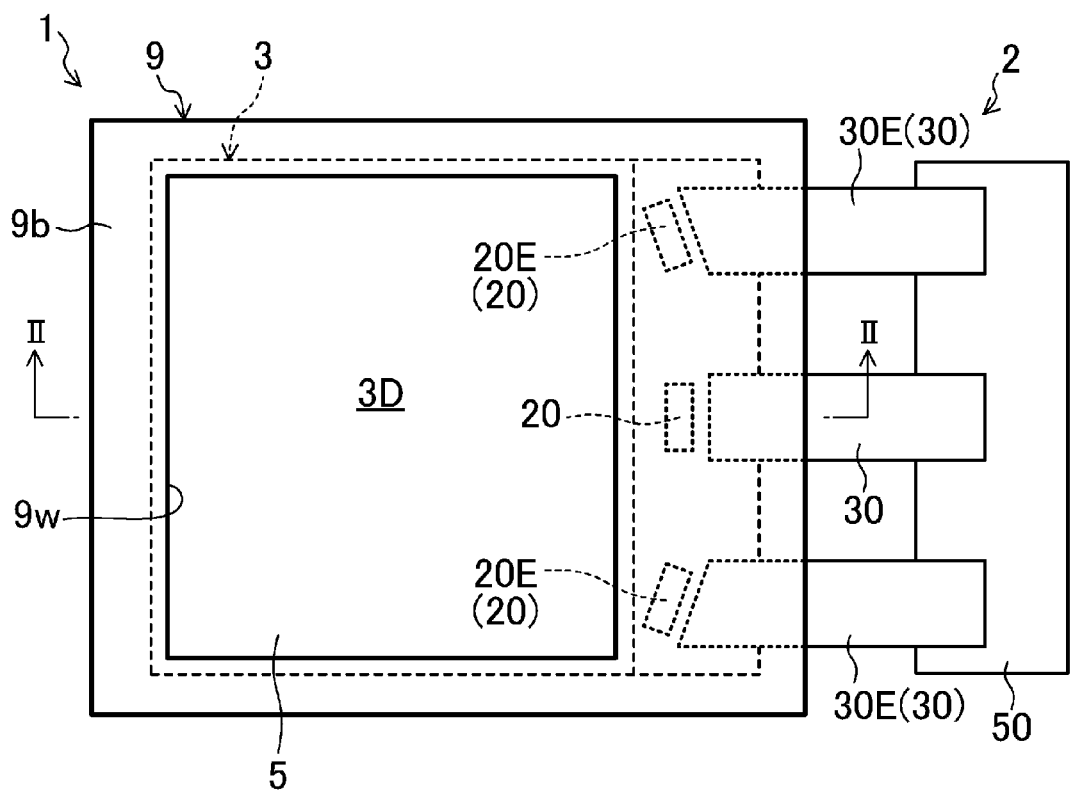
FIG. 1 is a plan view schematically illustrating a liquid crystal display device according to a first embodiment.
Figure 2:
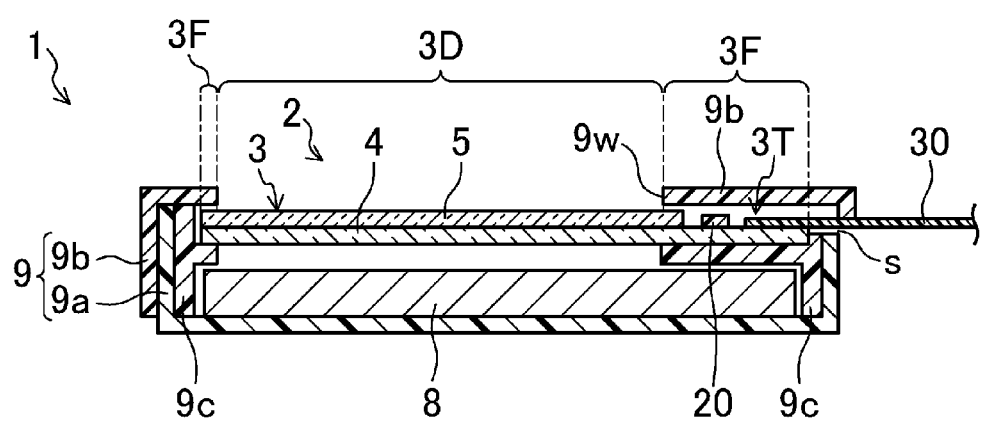
FIG. 2 is a cross-sectional view illustrating a cross-sectional structure taken along the line II-II of FIG. 1.

In a first embodiment, a liquid crystal display device 1 will be described as an example of a display device according to the present invention. FIG. 1 is a plan view schematically illustrating a configuration of the liquid crystal display device 1. FIG. 2 is a cross-sectional view illustrating a cross-sectional structure taken along the line II-II of FIG. 1.

The liquid crystal display device 1 of the present embodiment is used as, for example, a display of a television set, office automation (OA) equipment such as a personal computers, a smart phone, etc.

The liquid crystal display device 1 is an active matrix transmissive liquid crystal display device. As illustrated in FIGS. 1 and 2, the liquid crystal display device 1 includes a liquid crystal display module 2, a backlight unit 8 as a planar light source device arranged on a back surface of a liquid crystal display panel 3 which is a display panel included in the liquid crystal display module 2, and a housing 9 in which the liquid crystal display panel 3 and the backlight unit 8 are accommodated.

Figure 3:
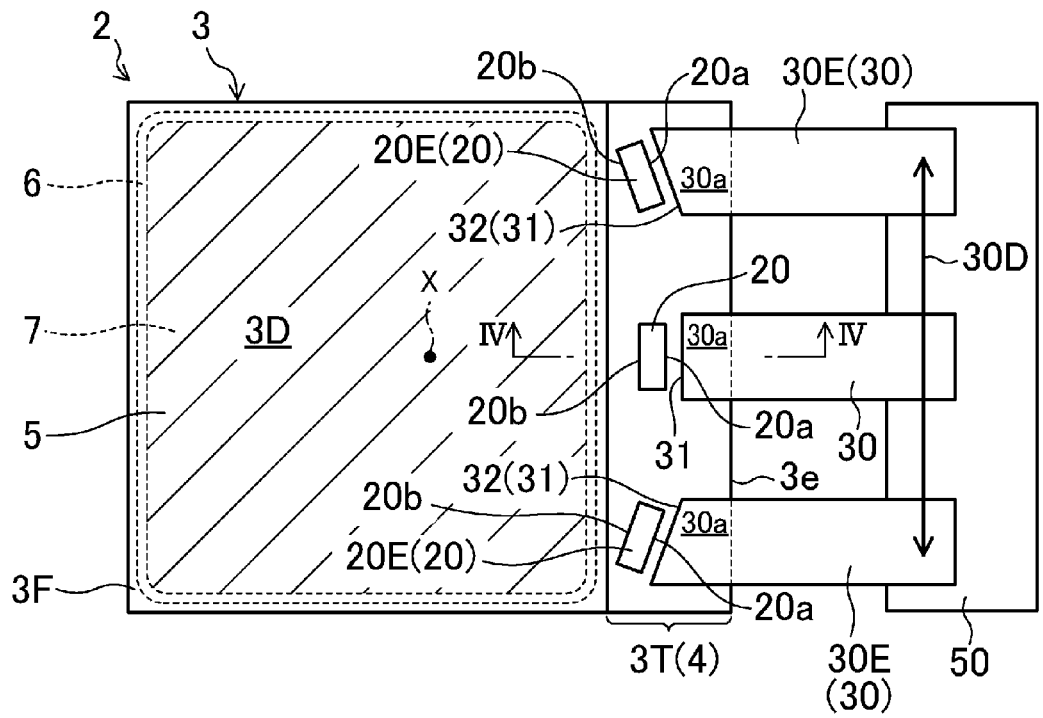
FIG. 3 is a plan view schematically illustrating a liquid crystal display module according to the first embodiment.
Figure 4:
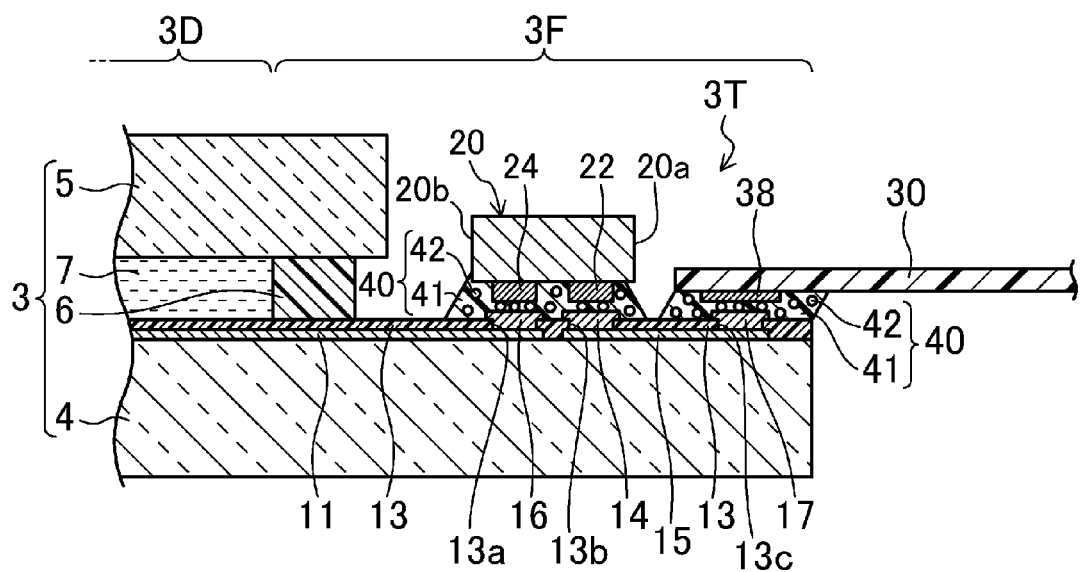
FIG. 4 is a cross-sectional view illustrating a cross-sectional structure taken along the line IV-IV of FIG. 3.

FIG. 3 is a plan view schematically illustrating a configuration of the liquid crystal display module 2. FIG. 4 is a cross-sectional view illustrating the cross-sectional structure taken along the line IV-IV of FIG. 3.

As illustrated in FIGS. 3 and 4, the liquid crystal display module 2 has a COG packaging structure. The liquid crystal display module 2 includes the liquid crystal display panel 3, a plurality of IC chips 20 as electronic circuit chips, a plurality of FPCs 30, and a control circuit board 50. The IC chips 20 serve as drivers directly mounted to a substrate 4 included in the liquid crystal display panel 3. One tip portion (left end portion in FIG. 3) of each FPC 30 is bonded to the substrate 4. The other tip portion (right end portion in FIG. 3) of each FPC 30 is connected to the liquid crystal display module 2.

The liquid crystal display panel 3 has, for example, a rectangular shape. The liquid crystal display panel 3 includes the active matrix substrate 4 and a counter substrate 5 which face each other. The liquid crystal display panel 3 has a structure in which peripheries of the substrates 4, 5 are bonded to each other with a sealing material 6 having, for example, a rectangular frame shape, and a liquid crystal layer 7 is enclosed in a space surrounded by the sealing material 6 between the substrates 4, 5.

The active matrix substrate 4 is, for example, a rectangular thin film transistor (TFT) substrate. Although not illustrated, a large number of gate interconnects and a large number of source interconnects which are display interconnects are formed on the active matrix substrate 4 such that the gate interconnects cross the source interconnects with an insulating film provided between the gate interconnects and the source interconnects. The gate interconnects and the source interconnects together form a lattice. A TFT and a pixel electrode connected to the TFT are provided in each of regions defined by the gate interconnects and the source interconnects in the lattice.

The counter substrate 5 is, for example, a rectangular color filter substrate. Although not illustrated, the counter substrate 5 includes a lattice-like black matrix corresponding to the gate interconnects and the source interconnects, color filters which are filter layers of a plurality of colors (e.g., red layers, green layers, and blue layers) periodically arranged in the regions in the lattice of the black matrix, and a common electrode covering the color filters and facing the pixel electrodes.

The active matrix substrate 4 and the counter substrate 5 have respective alignment films (not shown) on their inner surfaces facing each other. Polarizing plates (not shown) are each provided on an outer surface of a corresponding one of the substrates 4, 5 such that the transmission axes of the polarizing plates are different from each other by 90°. The sealing material 6 is made of a known resin (e.g., epoxy resin) having at least one of a thermosetting property or a photocurable property. The liquid crystal layer 7 is made of, for example, a nematic liquid crystal material having electro-optic characteristics.

Here, the TFT drive-type liquid crystal display panel 3 including a TFT substrate as the active matrix substrate 4 has been described as an example. However, the liquid crystal mode, picture structure, drive mode, etc. of the liquid crystal display panel 3 may be accordingly determined, and any liquid crystal display panel can be used as the display panel 3.

As illustrated in FIG. 3, the liquid crystal display panel 3 has a display region 3D (a hatched region in FIG. 3) for displaying an image. The display region 3D has, for example, a rectangular shape and is defined as a region at which the active matrix substrate 4 and the counter substrate 5 overlap each other and which is an inner region surrounded by the sealing material 6, that is, a region in which the liquid crystal layer 7 is provided. In the display region 3D, a plurality of pixels each of which is a minimum unit for displaying an image are arranged in a matrix. Each pixel is provided in the region defined by the gate interconnects and the source interconnects and provided with the TFT and the pixel electrode.

The liquid crystal display panel 3 has a picture-frame region 3F around the display region 3D. The picture-frame region 3F is a non-display region and has, for example, a rectangular frame shape. A terminal region 3T is defined on one side (on the right in FIG. 3) of the picture-frame region 3F. The terminal region 3T is part of the active matrix substrate 4 protruding from the counter substrate to expose a surface of the active matrix substrate 4 facing the counter substrate 5 at the terminal region 3T.

Tip portions 30a of the FPCs 30 are bonded to the terminal region 3T such that the tip portions 30a are spaced apart from each other by a predetermined adhesion length and extend from an edge 3e located at an extremity in a protrusion direction of the terminal region 3T (hereinafter simply referred to as an edge 3e of the terminal region 3T) toward the display region 3D. In the terminal region 3T, the IC chips 20 are arranged at positions located near the display region 3D so that each of the IC chip 20 faces a corresponding one of tip edges 31 of the FPCs 30 bonded to the terminal region 3T. The IC chips 20 are paired, on a one-to-one basis, with the FPCs 30, that is, each of the IC chips 20 is provided for a corresponding one of the FPCs 30.

As illustrated in FIG. 4, the IC chips 20 and the FPCs 30 are bonded to the terminal region 3T via an anisotropic conductive film (ACF) 40 obtained by, for example, diffusing conductive particles 42 in an insulative adhesive 41. The IC chip 20 and the FPC 30 in each pair are electrically connected to each other via a lead interconnect 15 formed on the terminal region 3T.

In the present embodiment, an ACF connection method has been described as an example of a method for connecting the IC chip 20 to the FPC 30. However, another connection method (e.g., a silver paste connection method in which silver paste is used) may be used as the method for connecting the IC chip 20 to the FPC 30.

Figure 5:
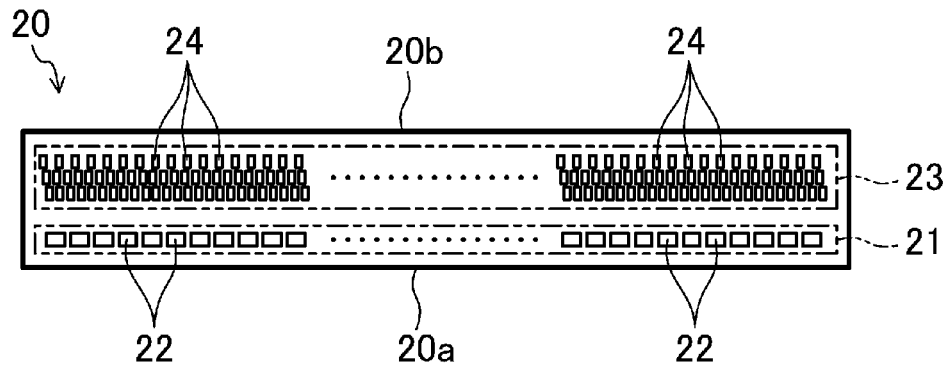
FIG. 5 is a bottom view schematically illustrating an IC chip.

FIG. 5 is a bottom view schematically illustrating the IC chip 20.

As illustrated in FIG. 5, each IC chip 20 has a rectangular shape when viewed in plan in a normal direction to a surface of the terminal region 3T. On a bottom surface of each IC chip 20, an input terminal section 21 to which a signal from the FPC 30 facing the IC chip 20 is input is provided along a long side 20a (lower side in FIG. 5) of the IC chip 20, and an output terminal section 23 from which a signal is output to the liquid crystal display panel 3 (terminal region 3T) is provided along a side 20b (upper side in FIG. 5) opposite to the long side 20a. As described above, the input terminal section 21 and the output terminal section 23 respectively extends along the long sides 20a and 20b of the IC chip 20. The longitudinal directions of the terminal sections 21, 23 correspond to the longitudinal direction of the IC chip 20.

The input terminal section 21 includes a plurality of input terminals 22 aligned, for example, in one row along the long side 20a of the IC chip 20. The output terminal section 23 includes a plurality of output terminals 24 aligned in a plurality of rows (three rows in the embodiment in FIG. 5) along the long side 20b of the IC chip 20, and the rows are arranged, for example, in parallel so that the output terminals 24 are arranged in a staggered pattern as a whole. Each of the input terminals 22 and the output terminals 24 is formed as a bump which is a protruding electrode terminal protruding from a back face of the IC chip 20.

On an adhesion surface of the tip portion 30a of each FPC 30 to be bonded to the terminal region 3T, a plurality of output terminals 38 illustrated in FIG. 4 are arranged along the tip edge 31 facing the IC chip 20 so that each of the output terminals 38 correspond to an associated one of the input terminals 22 of the IC chip 20 paired with the FPC 30. Each output terminal 38 is formed at one end section of each of interconnects (not shown) provided for the FPC 30.

On the other hand, in a region of the terminal region 3T corresponding to each IC chip 20, a plurality of chip output terminal pads 14 illustrated in FIG. 4 are provided such that each of the chip output terminal pads 14 corresponds to an associated one of the input terminals 22, and a plurality of chip input terminal pads 16 illustrated in FIG. 4 are provided such that each of the chip input terminal pads 16 corresponds to an associated one of the output terminals 24. In a region of the terminal region 3T corresponding to the bonded tip portion 30a of each FPC 30, a plurality of FPC input terminal pads 17 illustrated in FIG. 4 are provided such that each of the FPC input terminal pads 17 corresponds to an associated one of the output terminals 38.

The chip input terminal pads 16 are formed at positions corresponding to lead tips of lead interconnects 11 routed from a plurality of display interconnects such as the source interconnect and the gate interconnects provided on the display region 3D to the terminal region 3T. The lead interconnects 11 are covered with an insulating film 13. Each of the chip input terminal pads 16 is connected to a corresponding one of the lead tips of the lead interconnects 11 via a contact hole 13a formed in the insulating film 13.

The chip output terminal pads 14 correspond to the FPC input terminal pads 17 on a one-to-one basis, and each chip output terminal pad 14 is electrically connected to a corresponding one of the FPC input terminal pads 17 via the lead interconnect 15. The lead interconnects 15 extend from positions corresponding to the IC chips 20 to positions corresponding to the FPCs 30. The lead interconnects 15 are covered with the insulating film 13 together with the lead interconnects 11. Each chip output terminal pad 16 is connected to a corresponding one of tips of the lead interconnects 15 on one side (left side in FIG. 4) via a contact hole 13b formed in the insulating film 13. Each FPC input terminal pad 17 is connected to a corresponding one of tips of the lead interconnects 15 on the other side (right side in FIG. 4) via a contact hole 13c formed in the insulating film 13.

The conductive particles 42 in the ACF 40 are sandwiched between the input terminal 22 of each IC chip 20 and a corresponding one of the output terminal pads 14, so that the input terminal 22 is electrically connected to the output terminal pad 14. The conductive particles 42 in the ACF 40 are sandwiched between the output terminal 24 of each IC chip 20 and a corresponding one of the input terminal pads 16, so that the output terminal 24 is electrically connected to the lead interconnect 11 via the input terminal pad 16. The conductive particles 41 in the ACF 40 are sandwiched between the output terminal 38 of each FPC 30 and a corresponding one of the input terminal pads 17, so that the output terminal 38 is electrically connected to the input terminal pad 17.

The width of each FPC 30 is larger than each of the long sides 20a, 20b of the IC chip 20. The tip edge 31 of the FPC 30 faces the IC chip 20 entirely in a longitudinal direction of the IC chip 20. In an arrangement direction 30D of the FPCs 30, each FPC 30 has marginal regions extending on both sides of the IC chip 20 facing the FPC 30. That is, each IC chip 20 faces a center section of the tip edge 31 of the corresponding one of the FPCs 30. Each FPC 30 extends to the outside of the liquid crystal display panel 3 in a direction orthogonal to the edge 3e of the terminal region 3T and straddles the edge 3e.

In the present embodiment, as illustrated in FIG. 3, FPCs 30E are bonded at most outward positions in the arrangement direction 30D of the FPCs 30, that is, FPCs 30E are located at both ends of an array of the FPCs 30, and tip edges 31 of the FPCs 30E are edges 32 inwardly inclined to face the center X of the liquid crystal display panel 3 with respect to the edge 3e of the terminal region 3T.

Figure 7:
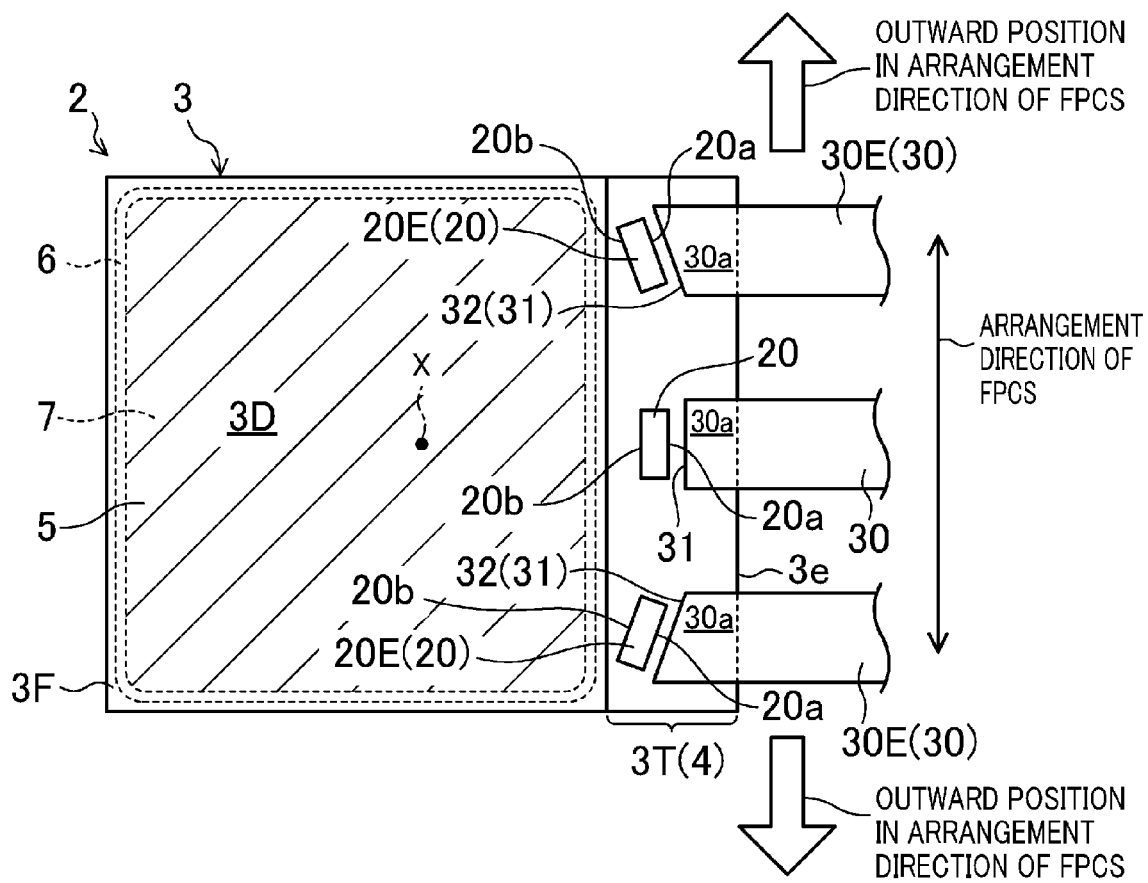
FIG. 7 is a view defining outward position in an arrangement direction of FPCs.

Note that "outward positions . . . in the arrangement direction 30D of the FPCs 30" here means positions located outwardly in directions indicated by the hollow arrows of FIG. 7, that is, in the arrangement (alignment) direction 30D in which the FPCs 30 are arranged. Moreover, "inward positions in the arrangement direction 30D of the FPCs 30" hereinafter means positions in directions opposite to the directions indicated by the hollow arrows of FIG. 7, that is, positions located inwardly in the arrangement (alignment) direction 30D in which the FPCs 30 are arranged.

A tip edge 31 of an FPC 30 (FPC 30 located at a center position in the embodiment illustrated in FIG. 3) other than FPCs 30E located on the most outward positions has an edge parallel to the edge 3e of the terminal region 3T. The inclined edges 32 of the FPCs 30E bonded at the most outward positions are positioned on the terminal region 3T and are closer to the display region 3D than the tip edge 31 of the FPC 30 other than the FPCs 30E is, so that inner ends of the inclined edges 32, that is, ends located on the inner positions in the arrangement direction 30D of the FPCs 30 are aligned to the tip edge 31, which is located on the side to be bonded to the terminal region 3T, of the FPC 30 other than the FPCs 30E in the arrangement direction 30D of the FPCs 30.

IC chips 20E facing the tip edges 31 of the FPCs 30E bonded at the most outward positions are arranged parallel to the inclined edges 32 of the FPCs 30E, that is, the long sides 20a facing the input terminal section 21 is arranged parallel to the inclined edges 31. Portions of both of the IC chips 20E opposite to the other IC chip 20 adjacent to the IC chips 20E are located closer to the display region 3D than the other IC chip 20 is.

As described above, the tip edges 31 of the FPCs 30E bonded at the most outward positions, as well as the IC chips 20E facing the FPCs 30E, have the edges 32 inclined to face the center X of the liquid crystal display panel 3. With this configuration, the connection reliability of the FPCs 30 to the liquid crystal display panel 3 can be enhanced without increasing the terminal region 3T.

Figure 6:
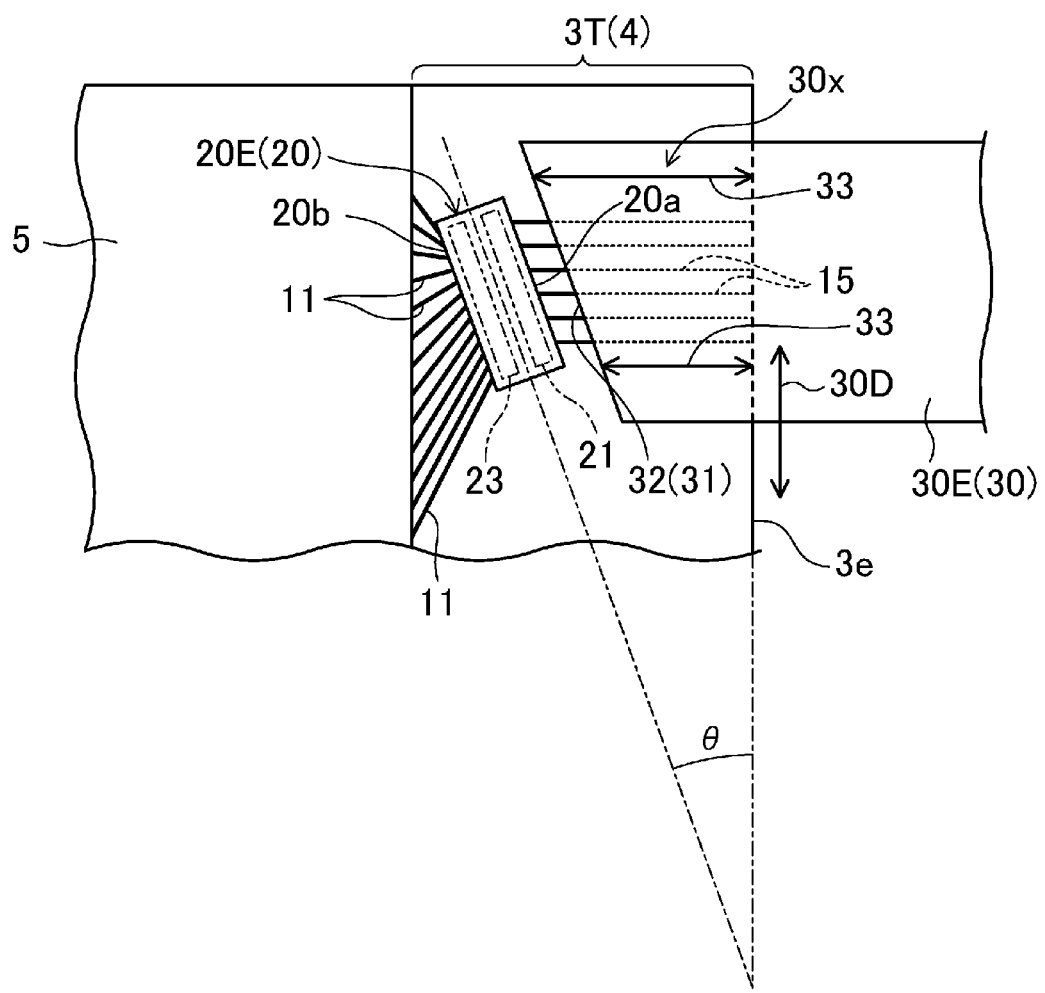
FIG. 6 is an enlarged plan view illustrating a substantial portion of the liquid crystal display device according to the first embodiment.

This will be described in detail below with reference to FIG. 6. FIG. 6 is an enlarged plan view illustrating a section at which the IC chip 20E and the FPC 30E are bonded to the terminal region 3T. FIG. 6 shows only the FPC 30E located on the most outward positions and the IC chip 20E facing the tip edge 31 of the FPC 30E on one side (upper side in FIG. 3) in the arrangement direction 30D of the FPCs 30. However, the FPC 30E located on the most outward position and the IC chip 20E facing the tip edge 31 of the FPC 30E on the other side (lower side in FIG. 3) have symmetrical positional relationship and shape with respect to a straight line running through the midway point (center) between the FPCs 30E on both the outward positions and extending along the protrusion direction of the terminal region 3T. This applies also to variation in FIGS. 9-14 which will be described later.

As illustrated in FIG. 6, the distance from the edge 3e of the terminal region 3T to the inclined edge 32 of the FPC 30E bonded at the most outward position gradually increases from an inside toward the outside of the terminal region 3T in the arrangement direction 30 of the FPCs 30. Accordingly, an adhesion length 33 of the FPC 30E bonded at the most outward position increases as the distance to the outside of the terminal region 3T decreases in the arrangement direction 30D of the FPCs 30. Thus, a side end portion (hereinafter also referred to as an outer end portion) 30x of the FPC 30E bonded at the most outward position has increased adhesiveness to the terminal region 3T, wherein the outer end portion is located on an outer position of the terminal region 3T in the arrangement direction of the FPCs 30 and is particularly susceptible to external force. Therefore, it is possible to enhance the connection reliability of the FPC 30E to the liquid crystal display panel 3.

The IC chip 20 facing the tip edge 31 of the FPC 30 bonded at the most outward position is arranged parallel to the inclined edge 32 of the FPC 30. Therefore, it is not necessary to increase the terminal region 3T to increase the adhesion length 33 of the FPC 30 due to the inclination of the tip edge 31 as described above. If the IC chip 20 is arranged parallel to the edge 3e of the terminal region 3T as in a conventional configuration, the IC chip 20 facing the tip edge 31 of the FPC 30 bonded at the most outward position has to be arranged at a position away from the edge 3e of the terminal region 3T by an increased part of the adhesion length 33 of the FPC 30 due to the inclined edge 31 so that the IC chip 20 and the FPC 30 do not overlap each other. Therefore, the terminal region 3T is inevitably increased. In contrast, in the present embodiment, the IC chip 20 is inclined parallel to the inclined edge 32 of the FPC 30. Therefore, it is possible to avoid overlapping of the IC chip 20 and the FPC 30 without increasing the terminal region 3T.

The angle θ formed between the inclined edge 32 of the FPC 30E bonded at the most outward position and the edge 3e of the terminal region 3T is determined to satisfy the following relationship: 0°<θ<45°.

If the angle θ formed between the inclined edge 32 of the FPC 30E bonded at the most outward position and the edge 3e of the terminal region 3T is greater than or equal to 45°, the IC chip 20E arranged along the inclined edge 32 of the FPC 30E is also inclined at the same angle as the inclined edge 32 of the FPC 30E, so that some of the lead interconnects 11 routed to positions corresponding to the IC chip 20E in the terminal region 3T have to be formed at a relatively small angle to the IC chip. Therefore, if a predetermined distance at which no leak is caused between the adjacent lead interconnects 11 is ensured in consideration of positional variations of the adjacent lead interconnects 11, the terminal region 3T may be increased compared to the case where each IC chip 20E is arranged parallel to and is not inclined relative to the edge 3e of the terminal region 3T. Thus, frame narrowing may be inhibited.

In contrast, in the present embodiment, the angle θ is greater than 0° and less than 45° as described above. Therefore, the tilt angle of the IC chip 20E arranged along the inclined edge 32 of the FPC 30E is also greater than 0° and less than 45° in accordance with the inclined edge 32 of the FPC 30E, so that the lead interconnects 11 routed to positions corresponding to the IC chip 20E can be formed at a relatively large angle to the IC chip 20E. With this configuration, it is possible to ensure a predetermined distance between the adjacent ones of the lead interconnects 11 without increasing the terminal region 3T. Thus, frame narrowing can be satisfactorily achieved while the connection reliability of the FPC 30 to the liquid crystal display panel 3 is enhanced.

Although not shown, the control circuit board 50 includes a control circuit such as a timing controller, FPC connectors each provided to the FPC 30, and a connector for connecting a system, and is connected to the FPCs 30 by inserting the tips of the FPCs 30 to the FPC connectors.

Although not shown, the backlight unit 8 includes a light source such as a light emitting diode (LED) and a cold-cathode tube, a light guide plate, and a plurality of optical sheets such as a reflection sheet, a diffusion sheet, and a prism sheet, and is configured so that light incident on the light guide plate from the light source is output as uniform planar light from the output plane of the light guide plate toward the liquid crystal display panel 3 via the optical sheets.

As illustrated in FIG. 2, the housing 9 includes a chassis 9a forming a body of an accommodation section and a bezel 9b disposed in front of the liquid crystal display panel 3.

A supporting member 9c for supporting the liquid crystal display panel 3 is provided in the chassis 9a. Using the supporting member 9c, the liquid crystal display panel 3 is disposed above the backlight unit 8. The bezel 9b has a window 9w through which the display region 3D of the liquid crystal display panel 3 is visibly exposed to the outside. The bezel 9b is fixed to, for example, a side wall of the chassis 9a by screwing, or the like. When the chassis 9a and the bezel 9b are combined with each other, a gap s is formed to face the terminal region 3T of the liquid crystal display panel 3. Each FPC 30 is lead out through the gap s to the outside of the housing 9 and is connected to the control circuit board 50.

FIGS. 1-4 show that each FPC 30 extends straight to a lateral side of the liquid crystal display panel 3 and is connected to the control circuit board 50. However, a tip portion of each FPC 30 extended to the outside of the housing 9 may be bowed in a curvy form so that the tip portion extends to a bottom surface (lower side in FIG. 2) of the housing 9.

Advantages of First Embodiment

Figure 8:
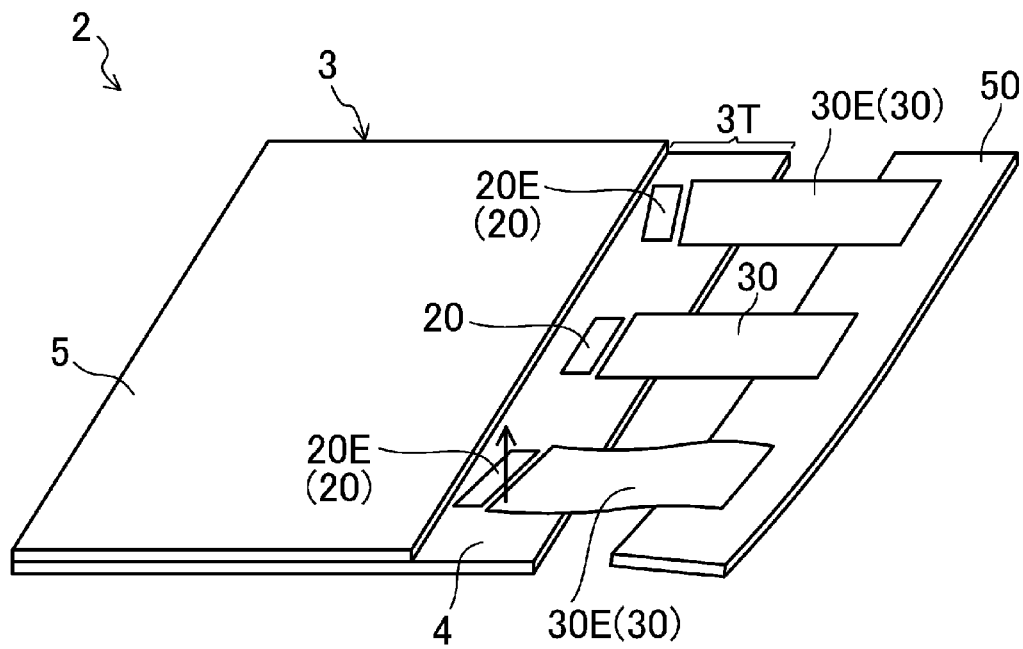
FIG. 8 is a perspective view illustrating a state in which external force is applied to the FPC of the liquid crystal display module according to the first embodiment.
Figure 17:
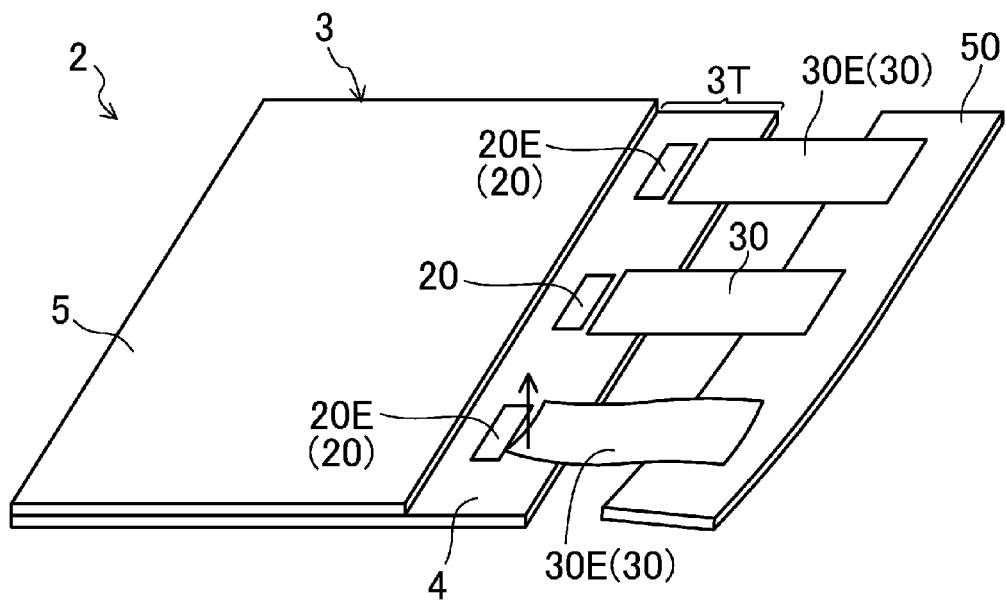
FIG. 17 is a perspective view illustrating a state in which external force is applied to a FPC of a liquid crystal display module having a conventional configuration.

FIG. 8 is a perspective view illustrating a state in which external force is applied to the FPCs 30 of the liquid crystal display module 2 of the first embodiment. FIG. 17 is a perspective view illustrating a state in which external force is applied to FPCs 30 of a conventional liquid crystal display module 2. The arrows in FIGS. 8 and 17 indicate the direction of the external force applied to the FPCs 30. In FIG. 17, the same reference symbols as those of components of the liquid crystal display device 1 according to the present embodiment are used for convenience.

In the present embodiment, the tip edges 31 of the FPCs 30E bonded at the most outward positions, as well as the IC chips 20E facing the tip edges 3, have the inclined edges 32 facing the center X of the liquid crystal display panel 3. Thus, the outer end portions 30x of the FPCs 30 bonded at the most outward positions can have increased adhesiveness to the terminal region 3T without increasing the terminal region 3T, wherein external force is applied, in particular, to the outside ends 30x.

In a fabrication process of the liquid crystal display device 1, for example, in accommodating the liquid crystal display panel 3 in the housing 9 together with the backlight unit 8, the FPC 30 of the conventional liquid crystal display module 2 is twisted by a warp and is thus deformed as illustrated in FIG. 17. When external force is applied to the outer end portions 30x of the FPC 30E bonded at the most outward position, the FPC 30E is likely to be delaminated from the terminal region 3T with the outer end portions 30x as the starting points of the delamination.

In contrast, in the present embodiment, as described above, the side end portions 30a of the FPCs 30E bonded at the most outward positions have improved adhesiveness to the terminal region 3, where external force is applied, in particular, to the side end portions 30a. Therefore, as illustrated in FIG. 8, even when the external force is applied to the side ends 30a of the FPCs 30E, the delamination of the FPCs 30E from the terminal region 3T can be prevented, and the connection reliability of the FPCs 30 to the liquid crystal display panel 3 can be enhanced. As a result, the liquid crystal display device 1 having the COG packaging structure and having high connection reliability of the FPCs 30 to the liquid crystal display panel 3 can be obtained while the picture-frame is narrowed.

First Variation of First Embodiment

Figure 9:
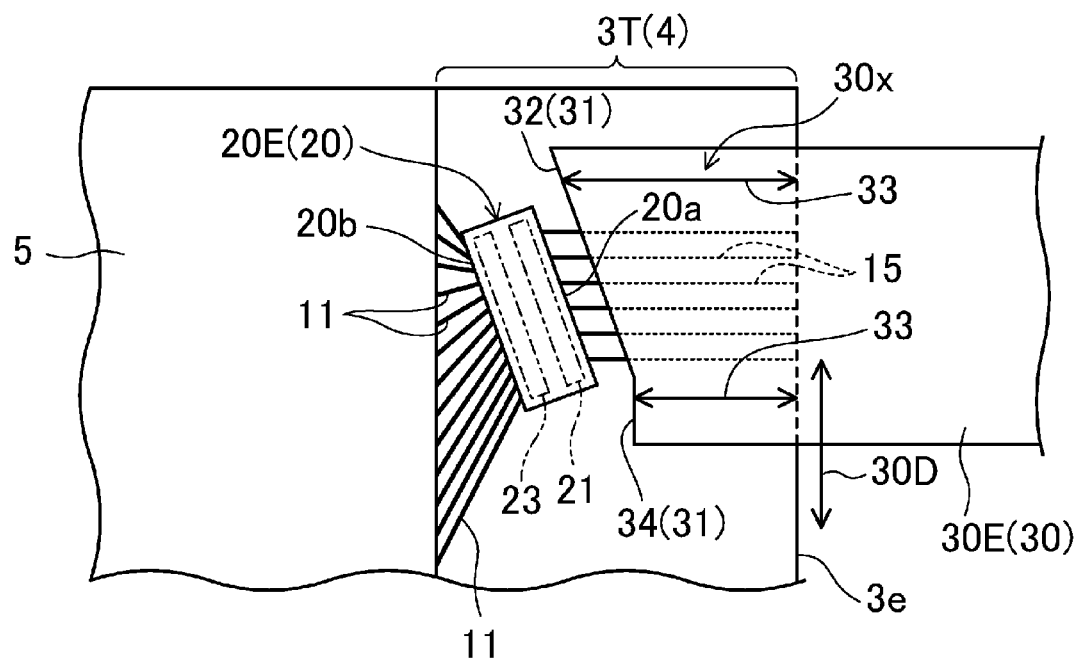
FIG. 9 is an enlarged plan view illustrating a substantial portion of a liquid crystal display device according to a first variation of the first embodiment.

FIG. 9 is an enlarged plan view illustrating an adhesion section of an IC chip 20E and an FPC 30E to a terminal region 3T of a first variation.

In the first embodiment, the tip edges 31 of the FPCs 30E bonded at the most outward position in the arrangement direction 30D of the FPCs 30 are the edges 32 inclined with respect to the edge 3e of the terminal region 3T. In the present variation, as illustrated in FIG. 9, a tip edge 31 of the FPC 30E bonded at the most outward position has an inclined edge 32 and an edge 34 parallel to an edge 3e of the terminal region 3T.

The parallel edge 34 of the FPC 30E is continuous with an inner end of the inclined edge 32, and is located inwardly (on the lower side in FIG. 9) from the inclined edge 32 in an arrangement direction 30D of FPCs 30. Similarly to the first embodiment, the IC chip 20E is disposed at a position to face the inclined edge 32 of the FPC 30E so that a long side 20a facing an input terminal section 21 of the IC chip 20E is also inclined parallel to the inclined edge 32. The parallel edge 34 of the FPC 30E extends farther inwardly in the arrangement direction 30D of the FPCs 30 than the inclined IC chip 20E.

With this configuration, the adhesion area of the FPC 30E to the terminal region 3T is increased by an area of the adhesion section of the FPC 30E extending from the inner end of the inclined edge 32 parallel to the edge 3e of the terminal region 3T compared to the case where the tip edge 31 of the FPC 30E bonded at the most outward position has the inclined edge 32. Thus, the FPC 30E bonded at the most outward position can have further increased adhesiveness to terminal region 3T.

Second Variation of First Embodiment

Figure 10:
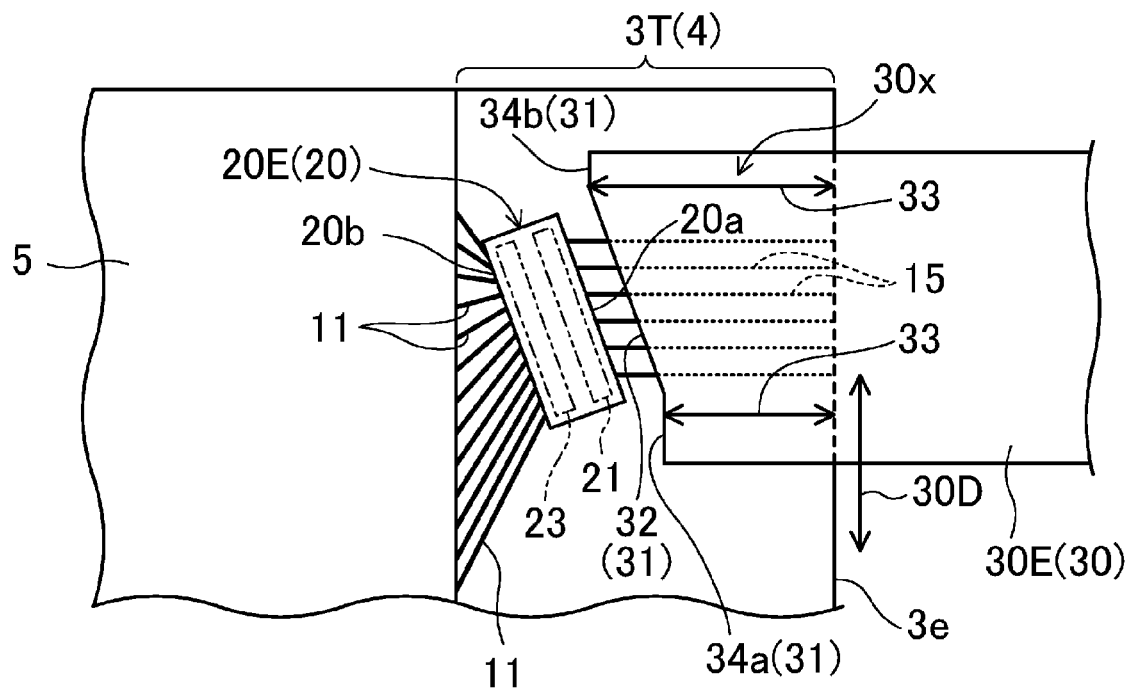
FIG. 10 is an enlarged plan view illustrating a substantial portion of a liquid crystal display device according to a second variation of the first embodiment.

FIG. 10 is an enlarged plan view illustrating an adhesion section of an IC chip 20E and an FPC 30E to a terminal region 3T according to a second variation.

In the second variation, as illustrated in FIG. 10, a tip edge 31 of the FPC 30E bonded at the most outward position has an inclined edge 32 and two edges 34a, 34b parallel to an edge 3e of the terminal region 3T.

The parallel edges 34a, 34b of the FPC 30E are continuous with opposite ends of the inclined edge 32. That is, the parallel edge 34a is continuous with an inner end of the inclined edge 32, and is located inwardly (on a lower side in FIG. 10) from the inclined edge 32 in an arrangement direction 30D of FPCs 30. The parallel edge 34b is continuous with an outer end of the inclined edge 32, that is, an end located outwardly (on an upper side in FIG. 10) in the arrangement direction 30D of FPCs 30, and is located outwardly from the inclined edge 32 in the arrangement direction 30D of FPCs 30.

Similarly to the first embodiment, the IC chip 20E is disposed at a position to face the inclined edge 32 of the FPC 30E so that a long side 20a facing an input terminal section 21 of the IC chip 20E is also inclined parallel to the inclined edge 32. The parallel edges 34a, 34b of the FPC 30E respectively extend farther inwardly and farther outwardly in the arrangement direction 30D of the FPCs 30 than the inclined IC chip 20E.

If the tip edge 31 of the FPC 30E bonded at the most outward position has the inclined edge 32, and a tip end portion of the inclined edge 32 of the FPC 30E, that is, a tip of the outer end portions 30x has a corner having an acute angle, stress caused by application of external force to the FPC 30E is concentrated on the corner. Therefore, the FPC 30E may be delaminated from the terminal region 3T with the corner as a starting point of the delamination.

In contrast, in the present variation, the tip edge 31 of the FPC 30E bonded at the most outward position has the edge 34b parallel to the edge 3e of the terminal region 3T and located outwardly from the inclined edge 32 in the arrangement direction 30D of FPCs 30. Therefore, the stress caused by application of external force to the FPC 30E is distributed at the part of the FPC 30E forming the parallel edge 34b. Thus, the delamination of the FPC 30E bonded at the most outward position from the terminal region 3T can be more satisfactorily prevented.

In addition, the tip edge 31 of the FPC bonded at the most outward position also has the parallel edge 34a located inwardly from the inclined edge 32 in the arrangement direction 30D of FPCs 30. Therefore, an advantage similar to that of the first variation can be obtained.

Third Variation of First Embodiment

Figure 11:
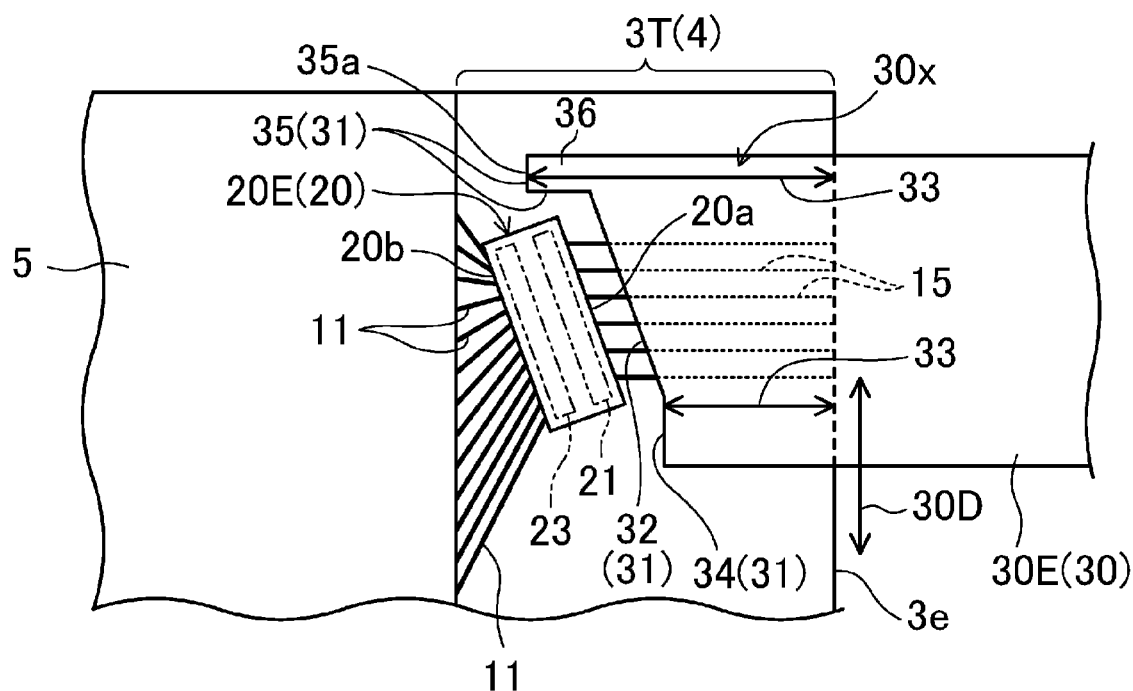
FIG. 11 is an enlarged plan view illustrating a substantial portion of a liquid crystal display device according to a third variation of the first embodiment.

FIG. 11 is an enlarged plan view illustrating an adhesion section of an IC chip 20E and an FPC 30E to a terminal region 3T according to a third variation.

As illustrated in FIG. 11, in the third variation, a tip edge 31 of the FPC 30E bonded at the most outward position has an inclined edge 32 and a parallel edge 34 continuous with an inner end of the inclined edge 32 similar to the first variation. The tip edge 31 further has an L-shaped edge 35. The L-shaped edge 35 extends from an outer end of the inclined edge 32 toward a lateral side of the IC chip 20E and extends then outwardly in an arrangement direction 30D of FPCs 30.

The FPC 30E bonded at the most outward position has a protrusion 36 protruding laterally outside the IC chip 20E, that is, to a lateral side located outwardly (on an upper side in FIG. 11) in the arrangement direction 30D of FPCs 30. An edge 35a located at a tip of the protrusion 36 in the protrusion direction is parallel to an edge 3e of the terminal region 3T.

With this configuration, the adhesion area of the FPC 30E to the terminal region 3T is increased by the protrusion 36 of the FPC 30E protruding laterally outside the IC chip 20E compared to the case where the tip edge 31 of the FPC 30E bonded at the most outward position has the inclined edge 32. Thus, the FPC 30E bonded at the most outward position can have further increased adhesiveness to the terminal region 3T.

The tip edge 31 of the FPC bonded at the most outward position also has the parallel edge 34 located inwardly (on a lower side in FIG. 11) from the inclined edge 32 in the arrangement direction 30D of FPCs 30. Therefore, an advantage similar to that of the first variation can be obtained. In addition, since the edge 35a located at the tip of the protrusion 36 in the protrusion direction is parallel to the edge 3e of the terminal region 3T, an advantage similar to that of the second variation can be obtained.

Fourth Variation of First Embodiment

Figure 12:
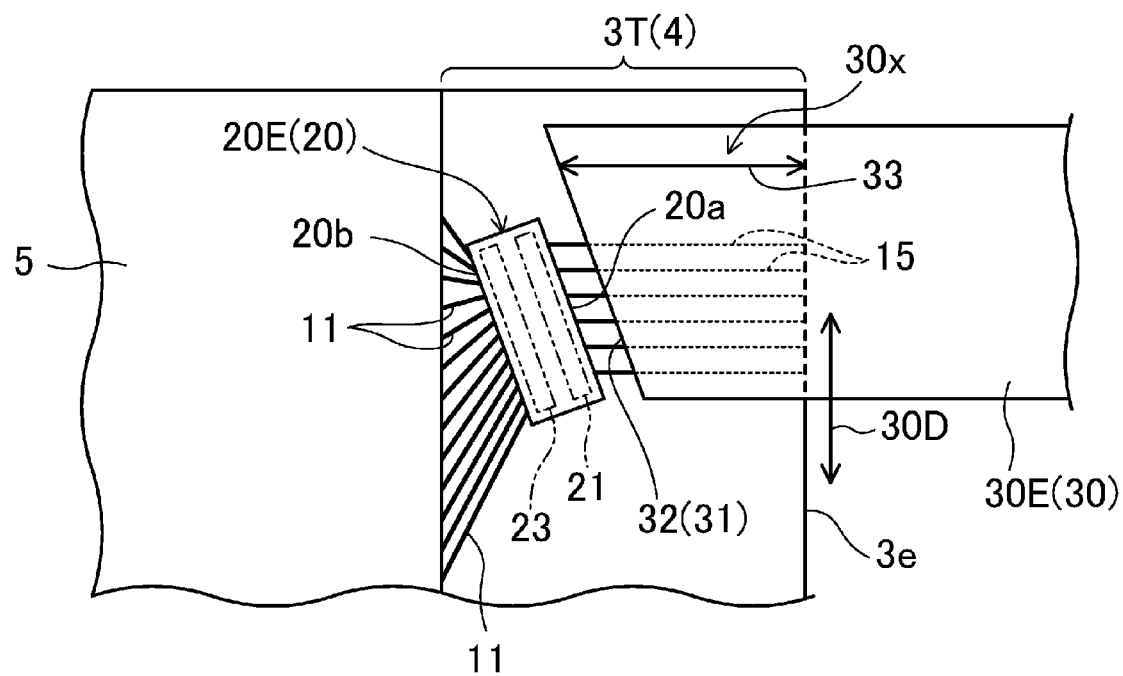
FIG. 12 is an enlarged plan view illustrating a substantial portion of a liquid crystal display device according to a fourth variation of the first embodiment.

FIG. 12 is an enlarged plan view illustrating an adhesion section of an IC chip 20E and an FPC 30E to a terminal region 3T according to a fourth variation.

In the first embodiment, each IC chip 20 faces the center section of the tip edge 31 of a corresponding one of the FPCs 30. In the fourth variation, as illustrated in FIG. 12, only the IC chip 20E facing a tip edge 31 of the FPC 30E bonded at the most outward position is aligned with a part of the tip edge 31 of the FPC 30E located inwardly (on a lower side in FIG. 12) in an arrangement direction 30D of FPCs 30.

With this configuration, it is not necessary to form an output terminal 38 near an outside end 30x of the FPC 30E bonded at the most outward position, wherein external force is applied particularly to the outer end portion 30x. Therefore, even if part of the FPC 30E is delaminated, the delamination does not influence the signal input from the FPC 30E to the liquid crystal display panel 3.

In addition, destruction of the output signal 38 and/or an input terminal pad 17 caused by delamination of the FPC 30E bonded at the most outward position can be prevented, and it is possible to reduce connection defects caused when FPC 30E is connected again.

Fifth Variation of First Embodiment

Figure 13:
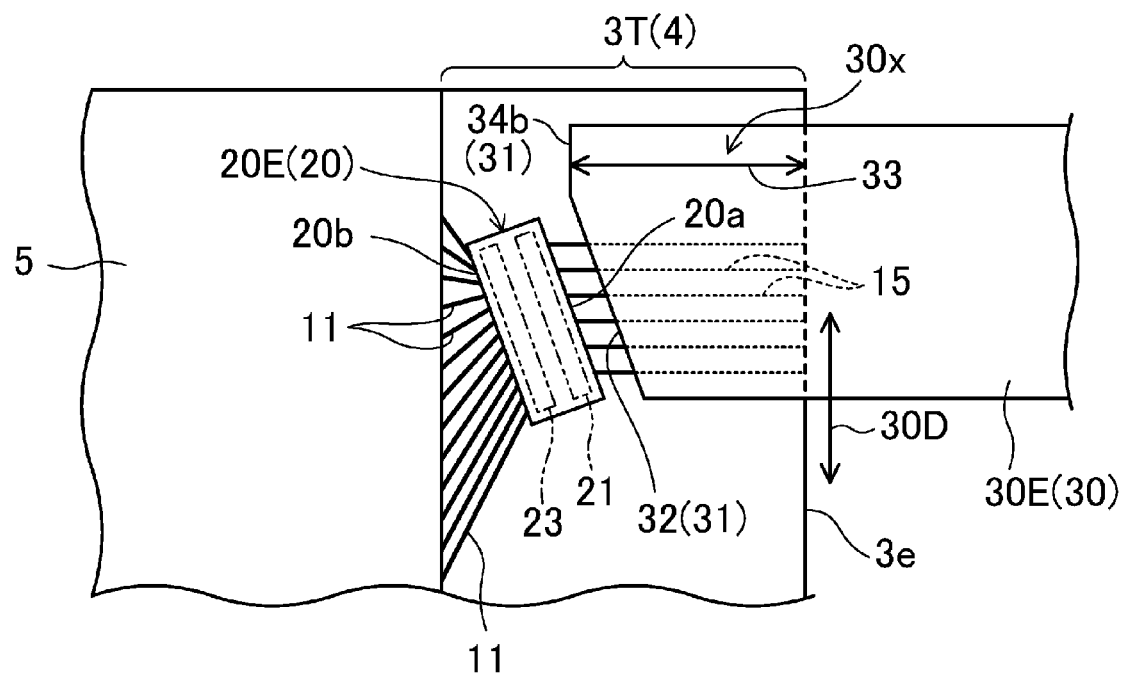
FIG. 13 is an enlarged plan view illustrating a substantial portion of a liquid crystal display device according to a fifth variation of the first embodiment.

FIG. 13 is an enlarged plan view illustrating a connection section of an IC chip 20E and an FPC 30E to a terminal region 3T according to a fifth variation.

In the fifth variation, as illustrated in FIG. 13, only the IC chip 20E facing a tip edge 31 of the FPC 30E bonded at the most outward position is aligned with a part of the tip edge 31 of the FPC 30E located inwardly (on a lower side in FIG. 13) in an arrangement direction 30D of FPCs 30 similarly to the fourth variation. The tip edge 31 of the FPC 30E bonded at the most outward position has an edge 34b which is continuous with an outer end of the inclined edge 32 and is parallel to an edge 3e of the terminal region 3T.

With this configuration, stress caused by application of external force to the FPC 30E bonded at the most outward position is distributed at the part of the FPC 30E forming the parallel edge 34b. Therefore, in addition to an advantage similar to that of the fourth variation, it is also possible to more satisfactorily prevent the delamination of the FPC 30E from the terminal region 3T.

Sixth Variation of First Embodiment

Figure 14:
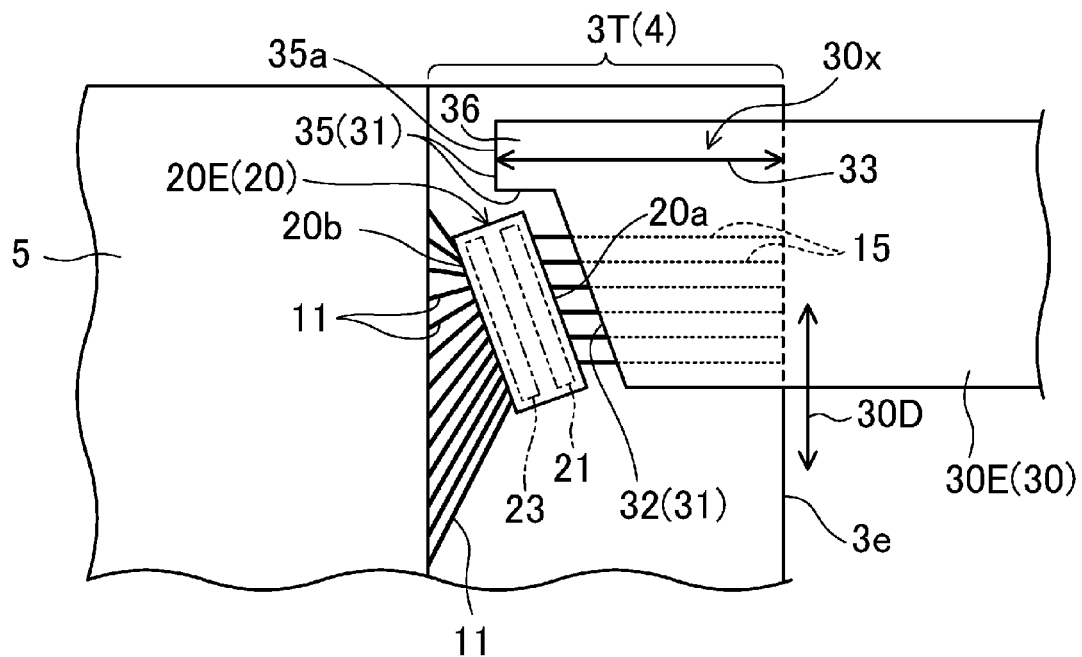
FIG. 14 is an enlarged plan view illustrating a substantial portion of a liquid crystal display device according to a sixth variation of the first embodiment.

FIG. 14 is an enlarged plan view illustrating an adhesion section of an IC chip 20E and an FPC 30E to a terminal region 3T according to a sixth variation.

In the sixth variation, as illustrated in FIG. 14, only the IC chip 20E facing a tip edge 31 of the FPC 30E bonded at the most outward position is aligned with a part of the tip edge 31 of the FPC 30E located inwardly (on a lower side in FIG. 14) in an arrangement direction 30D of FPCs 30 similarly to the fourth variation. The FPC 30E bonded at the most outward position is provided with a protrusion 36 protruding laterally outside (upper side in FIG. 14) the IC chip 20E. An edge 35a located at a tip of the protrusion 36 in the protrusion direction is parallel to an edge 3e of the terminal region 3T.

With this configuration, an advantage similar to that of the fourth variation can be obtained. Additionally, the adhesion area of the FPC 30E to the terminal region 3T is increased by the protrusion 36 of the FPC 30E protruding laterally outside the IC chip 20E compared to the case where the tip edge 31 of the FPC 30E bonded at the most outward position has the inclined edge 32. In addition, the width of the protrusion 36 can be larger than that in the case where the IC chip 20E facing the tip edge 31 of the FPC 30E bonded at the most outward position faces the center section of the tip edge 31 of the FPC 30E as in the third variation. Therefore, the adhesiveness of the FPC 30E to the terminal region 3T can be satisfactorily increased.

In addition, since the edge 35a located at the tip of the protrusion 36 in the protrusion direction is parallel to the edge 3e of the terminal region 3T, an advantage similar to that of the second variation can be obtained.

Second Embodiment of Invention

Figure 15:
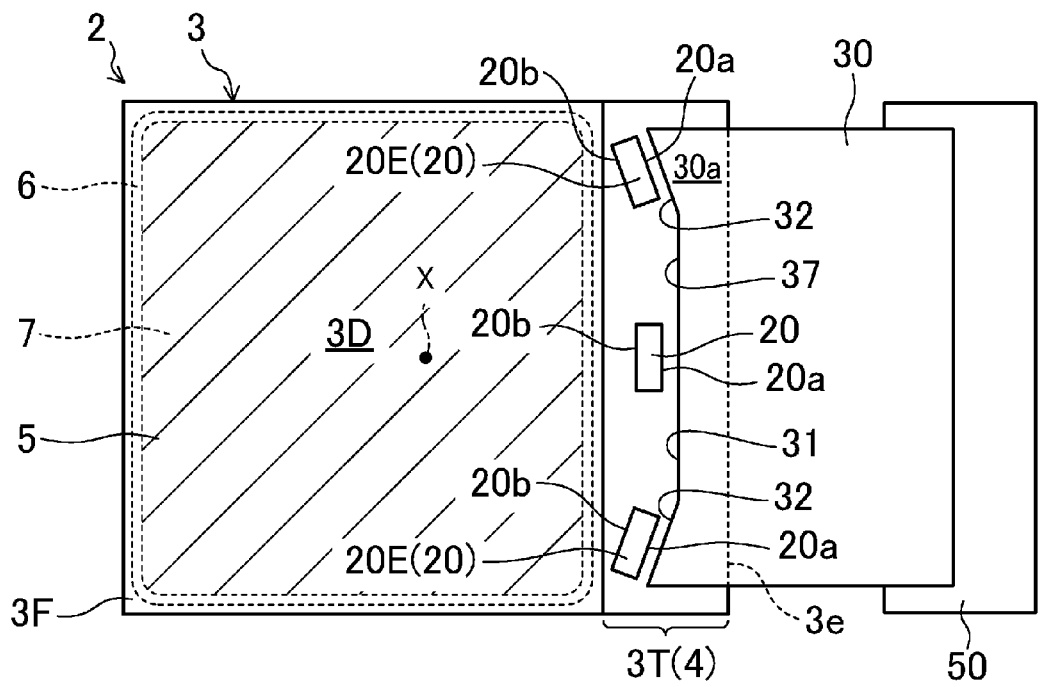
FIG. 15 is a plan view schematically illustrating a liquid crystal display module according to a second embodiment.

FIG. 15 is a plan view of a liquid crystal display module 2 according to a second embodiment. In the present embodiment, a liquid crystal display device 1 has a configuration similar to that of the first embodiment except for the configuration of FPCs 30. Therefore, only the FPC 30 will be described. The same parts as those in FIGS. 1-14 are indicated by the same reference characters in the first embodiment, and will not be described in detail.

In the first embodiment, each of the FPCs 30 is provided for a corresponding one of the IC chips 20. However, in the present embodiment, as illustrated in FIG. 15, only one FPC 30 is provided for a plurality of IC chips 20 and is bonded to a terminal region 3T over an entire region along the IC chips 20.

A tip edge 31 of the FPC 30 has inclined edges 32 facing the center X of the liquid crystal display panel 3 with respect to an edge 3e of the terminal region 3T. The inclined edges 32 are both end parts of the tip edge 31 of the FPC 30 which are located on outer positions of the terminal region 3T.

Figure 16:
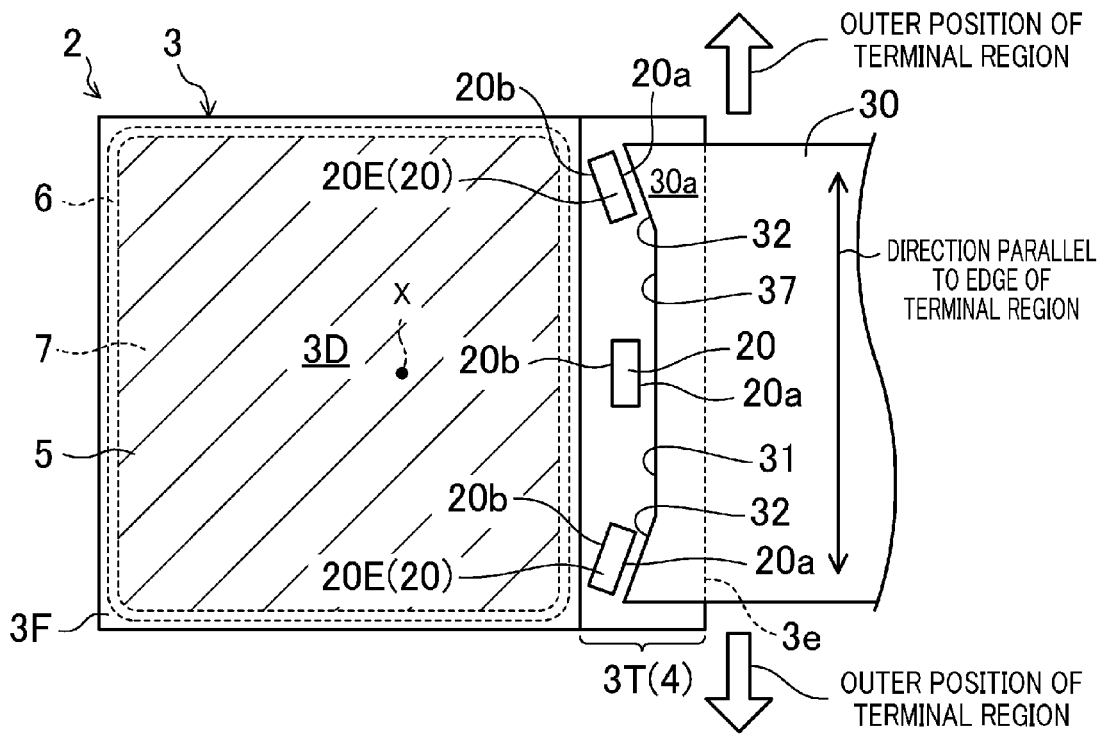
FIG. 16 is a view defining outward positions of a terminal region.

Note that "outer positions of the terminal region 3T" here means outer positions of the terminal region 3T which are located in directions indicated by the hollow arrows in FIG. 16, that is, in a direction along the edge 3e of the terminal region 3T.

Similarly to the first embodiment, the angle θ formed between the inclined edge 32 of the FPC 30 and the edge 3e of the terminal region 3T is determined so that the following relationship is satisfied: 0°<θ<45°. At the tip edge 31 of the FPC 30, a middle portion between both ends of the inclined edges 32 of the FPC 30 is an edge 37 parallel to the edge 3e of the terminal region 3T.

The IC chips 20 are arranged on the terminal region 3T to face the tip edges 31, which is located on the side to be bonded to the terminal region 3T, of the FPCs 30. IC chips 20E located on both ends in an array of these IC chips 20 are provided at positions facing the inclined edges 32 of the FPC 30, and are arranged along the inclined edges 32, that is, arranged such that their long sides 20a facing an input terminal section 21 extend parallel to the inclined edges 32. Other IC chips (IC chips located at center positions in the embodiment illustrated in FIG. 14) 20 are arranged such that their long sides 20a facing input terminal section 21 extend along the parallel edge 37 of the FPC 30.

Advantages of Second Embodiment

Also in the second embodiment, both of the ends of the tip edge 31 of the FPC 30, as well as the IC chips 20E facing the ends, have the inclined edges 32 facing the center X of the liquid crystal display panel 3. Thus, the adhesiveness of the side end portions (hereinafter referred to as outer end portions) 30x of the FPC 30 to the terminal region 3T can be increased without increasing the terminal region 3T, wherein the outside ends 30x located on the outer positions of the terminal region 3T is particularly susceptible to the external force. Thus, the connection reliability of the FPC 30 to the liquid crystal display panel 3 can be enhanced.

The FPC 30 is adhered to all portions of the terminal region 3T corresponding to spaces between the IC chips 20. Therefore, the FPC 30 can be firmly adhered to the terminal region 3T over the entire width direction thereof. Thus, it is possible to more satisfactorily prevent the delamination of the FPC 30 from the terminal region 3T.

Similarly to the second variation of the first embodiment, in the second embodiment, an edge 34b which is continuous with an outer end of the inclined edge 32 and is parallel to the edge 3e of the terminal region 3T is preferably provided at the tip edge 31 of the FPC 30. With this configuration, stress caused by application of external force to the outer end portion 30x of the FPC 30 is distributed at the part of the FPC 30 forming the parallel edge 34b. Therefore, it is possible to more satisfactorily prevent the delamination of the FPC 30 from the terminal region 3T.

Similarly to the third variation of the first embodiment, in the second embodiment, the FPC 30 preferably includes a protrusion 36 protruding laterally outside the IC chip 20E. With this configuration, the adhesiveness of the outer end portion 30x of the FPC 30 to the terminal region 3T can be further increased. An edge of the protrusion 36 located at the tip of the protrusion 36 in the protrusion direction thereof is preferably parallel to the edge 3e of the terminal region 3T so that stress caused by application of external force to the outer end portion 30x of the FPC 30 is satisfactorily dispersed.

While the preferred embodiments and their variations of the present invention have been described, the technical range of the present invention is not limited to the range defined by these embodiments and variations. It will be understood by those skilled in the art that the above-described embodiments and variations are mere illustrative, other a wide variety of variations are possible by combining the components of these embodiments and variations, and such variations also fall within the scope of the present disclosure.

For example, in the first embodiment, first to sixth variations of the first embodiment, and the second embodiment, an IC chip 20 having a rectangular shape when viewed in plan has been described as an example, but the present invention is not limited to this example. The IC chip 20 may have a square shape when viewed in plan, or may have any other shape.

In the first and second embodiments, the angle θ formed between the inclined edge 32 of the FPCs 30E, 30 and the edge 3e of the terminal region 3T is greater than 0° and less than 45°. However, the present invention is not limited to these embodiments. The angle θ may be greater than or equal to 45° and less than 90°.

In each of the embodiments, the transparent liquid crystal display device 1 has been described as an example, but the present invention is not limited to this example. The present invention is of course applicable to semi-transmissive or reflective liquid crystal display devices. The present invention is applicable to other display devices such as organic electro luminescence (EL) display devices, plasma display devices, etc. as long as the display devices have the COG packaging structure in which IC chips 20 and FPCs 30 are adhered to a display panel.

INDUSTRIAL APPLICABILITY

As described above, the present invention is useful for display devices such as liquid crystal display devices having the COG packaging structure, and is particularly suitable to display devices for which higher connection reliability of the FPC to the display panel is demanded at the same time with frame narrowing.

DESCRIPTION OF REFERENCE CHARACTERS s Gap Between Chassis and Bezel
X Center of Liquid Crystal Display Panel
1 Liquid Crystal Display Device (Display Device)
2 Liquid Crystal Display Module
3 Liquid Crystal Display Panel (Display Panel)
3D Display Region
3F Picture-Frame Region
3T Terminal Region
3e Edge of Terminal Region (Edge of Terminal Region)
4 Active Matrix Substrate
5 Counter Substrate
6 Sealing Material
7 Liquid Crystal Layer
8 Backlight Unit
9 Housing
9a Chassis
9b Bezel
9w Window
11 Lead Interconnect
13 Insulating Film
13a, 13b, 13c Contact Hole
14 Chip Output Terminal Pad
15 Lead Interconnect
16 Chip Input Terminal Pad
17 FPC Input Terminal Pad
20, 20E IC Chip (Electronic Circuit Chip)
20a, 20b IC Chip Long Side
21 Input Terminal Section
22 IC Chip Input Terminal
23 Output Terminal Section
24 IC chip Output Terminal
30, 30E Flexible Printed Circuit Board (FPC)
30a Tip Portion of FPC
30x Outer End Portion of FPC
30D Arrangement Direction of FPCs
31 Tip Edge of FPC
32 Inclined Edge
34, 34a, 34b, 37 Parallel Edge
35 Inverted-L-Shaped Edge
35a Edge of Protrusion
36 Protrusion
38 Output Terminal of FPC
40 ACF
41 Adhesive
42 Conductive Particle
50 Control Circuit Board

The invention claimed is:

1. A display device comprising:
a display panel having a display region and a terminal region;
a plurality of flexible printed circuit boards arranged along a periphery of the terminal region and having tip portions bonded to the terminal region; and
a plurality of electronic circuit chips each arranged on the terminal region to face a tip edge of a corresponding one of the bonded flexible printed circuit boards, wherein
the tip edges of the flexible printed circuit boards bonded at most outward positions in an arrangement direction of the flexible printed circuit boards have edges inclined relative to an edge of the terminal region to face a center of the display panel, and
the electronic circuit chips facing the tip edges of the flexible printed circuit boards bonded at the most outward positions are arranged parallel to the inclined edges of the flexible printed circuit boards.

2. The display device of claim 1, wherein
each of the tip edges of the flexible printed circuit boards bonded at the most outward positions has a parallel edge which is continuous with the inclined edge and is parallel to the edge of the terminal region, and
the parallel edge is located outwardly from the inclined edge in the arrangement direction of the flexible printed circuit boards.

3. The display device of claim 1, wherein
an angle θ formed between the inclined edge and the edge of the terminal region is determined to satisfy an inequality 0°<θ<45°.

4. A display device of claim 1, wherein
the display panel is a liquid crystal display panel.

5. A display device comprising:
a display panel having a display region and a terminal region;
a flexible printed circuit board having a tip portion bonded to the terminal region; and a plurality of electronic circuit chips arranged in the terminal region to face a tip edge of the bonded flexible printed circuit board, wherein the tip edge of the flexible printed circuit board has edges inclined relative to an edge of the terminal region to face a center of the display panel, the inclined edges are located at both end portion of the tip edge of the flexible printed circuit board, and the electronic circuit chips arranged at positions facing the inclined edges are inclined parallel to the inclined edges.

6. The display device of claim 5, wherein an angle $\theta$ formed between the inclined edge and the edge of the terminal region is determined to satisfy an inequality $0°<\theta<45°$.

* * * * *